United States Patent [19]

Matsumura et al.

[11] Patent Number: 4,859,481
[45] Date of Patent: Aug. 22, 1989

[54] METHOD FOR PRODUCING FRUIT CHIPS

[75] Inventors: Yasushi Matsumura; Takeshi Mizuguchi, both of Nara; Fumio Matsui, Moriguchi, all of Japan

[73] Assignee: House Food Industrial Company Limited, Osaka, Japan

[21] Appl. No.: 172,088

[22] Filed: Mar. 23, 1988

[30] Foreign Application Priority Data

Mar. 24, 1987 [JP] Japan ................................. 62-69769

[51] Int. Cl.⁴ .............................................. A23B 7/02
[52] U.S. Cl. .................................... 426/445; 426/465; 426/473
[58] Field of Search ............... 426/615, 640, 465, 473, 426/242, 244, 445, 639, 385; 34/5, 15

[56] References Cited

U.S. PATENT DOCUMENTS

| | | | |
|---|---|---|---|
| 233,473 | 10/1880 | Cassidy | 426/465 |
| 2,340,170 | 1/1944 | Baer | 426/465 |
| 2,708,636 | 5/1955 | Rivoche | 426/244 |
| 3,510,314 | 5/1970 | Lima et al. | 426/640 |
| 3,879,568 | 4/1975 | Luh et al. | 426/465 |
| 4,520,574 | 6/1985 | Sugisawa et al. | 34/5 |

FOREIGN PATENT DOCUMENTS 2720174 11/1978 Fed. Rep. of Germany ...... 426/615
48410 10/1984 Japan ................................. 426/465

Primary Examiner—Peter Kratz
Attorney, Agent, or Firm—Oblon, Spivak, McClelland, Maier & Neustadt

[57] ABSTRACT

A method for producing banana chips which retain the inherent taste of fresh banana, have excellent appearance without quality repairment due to drying and without any browning. This method comprises the steps of (a) cutting bananas into small pieces; (b) subjecting the pieces of bananas to a temperature conditioning treatment; (c) expanding the temperature conditioned pieces to bananas by quickly reducing the pressure from normal pressure to a prescribed reduced pressure; and (d) heating the expanded pieces of bananas under a reduced pressure; the time elapsed from the cutting steps (a) to the completion of reduction of the pressure in the step (c) being not more than 20 minutes.

4 Claims, 1 Drawing Sheet

METHOD FOR PRODUCING FRUIT CHIPS

BACKGROUND OF THE INVENTION

1. Field of the Invention

The present invention relates to a method for producing chips of bananas which are properly expanded without impairing the inherent taste and color of the fruit and which are good in texture, light and crisp.

2. Description of the Prior Art

Heretofore, there have been developed a variety of snack foods. For this reason, there have been conducted various studies and research into drying techniques, which are an important aspect of producing snack foods. As typical examples, there may be mentioned such drying techniques as hot-air drying, microwave drying, freeze-drying, deep-frying, and drying under a reduced pressure. Moreover, there is known a method for expanding and drying foods in which a material to be dried is exposed to the flow of superheated steam for a short period of time and the superheated and dehydrated material is then rapidly discharged into the air to cause expansion thereof. However, the snack foods produced according to this conventional drying method have a defect of producing a smell of superheated material due to the heat during drying or cause the loss and degeneration of the taste thereof.

The applicant of this invention has already developed a method for drying foods effective in practicing a method for producing snack foods which makes it possible to eliminate the foregoing drawbacks (see Japanese Patent Unexamined Publication (hereunder referred to simply as "J.P. KOKAI") No. 59-159739). This method comprises quickly reducing the pressure applied to foods such as shaped dough mainly composed of vegetables, fruits or the like, or solids obtained by processing or cooking such shaped material, at a rate sufficient to expand these foods and to freeze the moisture in the foods, heating the foods to dry the same after the moisture therein is frozen and then returning the pressure to normal pressure.

OBJECT OF THE INVENTION

However, if banana is treated by the aforementioned method for drying to obtain a snack food, it is sometimes observed that, depending on the degree of maturity of the banana, the kind thereof and the place at which the banana was grown, the surface layer of the banana snack is too soft. In other words, depending on the quality of the starting bananas, there is sometimes obtained a product with unsatisfactory properties.

In addition, the snack foods obtained by the conventional method utilizing bananas do not have the inherent taste of banana and the color thereof is changed to brown. In particular, there is observed a significant change in color which leads to the lowering of the commercial value thereof as a snack food.

The present invention intends to solve the problems associated with the conventional methods for drying foods to obtain snack foods and to provide a new method for producing chips of bananas capable of providing such chips which are good in texture, are crisp and have an appearance and taste appropriate to a snack food.

SUMMARY OF THE INVENTION

Figure 1:
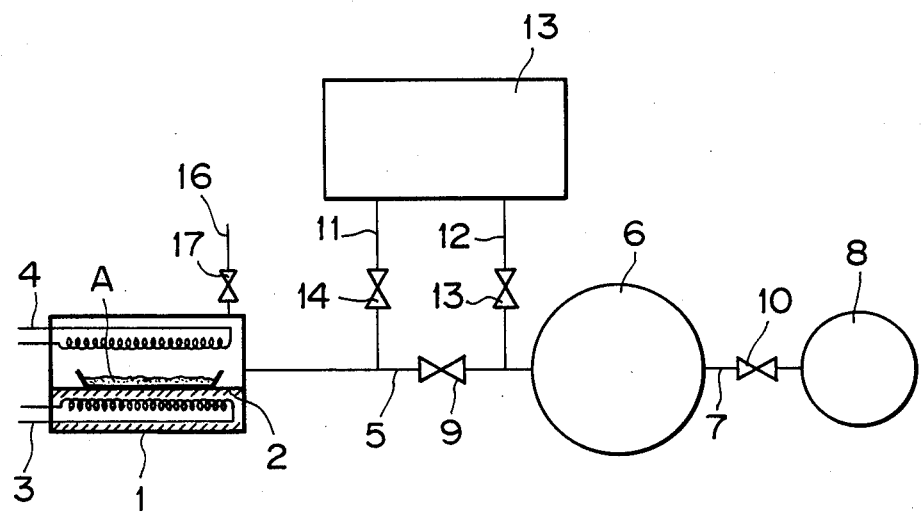
FIG. 1 is a schematic diagram illustrating an example of a specific apparatus which may be used in practicing the method of this invention.

According to the present invention, there is provided a method for producing chips of fruits which comprises the steps of:

(a) cutting bananas into small pieces;
(b) subjecting the pieces of bananas to a temperature conditioning treatment;
(c) expanding the temperature conditioned pieces of bananas by quickly reducing the pressure from normal pressure to a prescribed reduced pressure; and
(d) heating the expanded pieces of bananas under a reduced pressure;

the time elapsed from the cutting step (a) to the completion of reduction of the pressure in the step (c) being not more than 20 minutes.

The present invention will hereunder be explained in more detail.

Fruits which are the subject of the present invention are bananas such as Philippine bananas. These bananas are first peeled followed by cutting into pieces of a proper size. The size of these cut bananas is not critical, however, it is preferred to cut them into slices having a thickness of about 3 to 5 mm taking into consideration the fact that the final product is to be a snack food.

The cut bananas are then subjected to temperature conditioning treatment. This treatment is carried out to make the temperature of the fruits uniform and specifically the temperature thereof is controlled to about 5° to 20° C., preferably from about 7° to 13° C. The temperature conditioning treatment is carried out by, for instance, packing the cut banana in a bag and immersing the bag in running water of a desired temperature, packing the cut banana in a container and immersing the container in a constant temperature bath, permitting the cut banana to stand at normal temperature, or putting the cut banana in a refrigerator adjusted to around 5° C. The treatment time will vary depending on the treating methods but is preferably in the range of about 5 to 30 minutes. Preferred among these methods are that of packing the cut bananas in an appropriate bag and immersing the bag in running water and that of placing the cut bananas in a refrigerator adjusted to around 5° C. since the treatment time by these methods is short (about 3 to 10 minutes).

After the temperature conditioning treatment, the pieces of bananas are expanded under a reduced pressure. If foods are maintained at a reduced pressure, the boiling point of the water therein is lowered and for this reason, the moisture in the foods, in particular, free water therein is evaporated off. The foods can be expanded by quickly evaporating such moisture in the foods within a very short period of time. For this reason, the expansion treatment referred to in the present invention is carried out by reducing the pressure applied to these foods at a rate sufficient to quickly evaporate the moisture in the foods within a short period of time. The expansion due to the evaporation of moisture is greatly affected by the kind of foods and, therefore, the rate of the pressure reduction required to cause expansion also varies depending thereon. In the present invention, the expansion treatment is preferably carried out by reducing the pressure, within about 1 minute, from normal pressure to a prescribed reduced pressure. The reduced pressure is preferably in the range of 150 to 500 Pa. This is because if the reduced pressure is less than 150 Pa, the resultant chips are soft and are less crisp. While if the reduced pressure is more than 500 Pa, the resultant chips become very hard and are of poor quality or thin due to drying.

The banana pieces are preferably maintained at such a reduced pressure for a desired period of time after quickly reducing the pressure to such a pressure. The time for maintaining the fruits at that pressure is preferably 5 to 15 minutes whereby these fruits can be properly frozen while maintaining the shape thereof.

The expanded bananas are then heated at a reduced pressure lower than that in the expansion step to dry the same. The use of such a lower reduced pressure in this heat drying step is to dry the banana pieces without impairing their quality by drying while maintaining the internal portion thereof in the proper frozen state. The pressure during the heat-drying step preferably ranges from about 20 to 50 Pa. The heating temperature is suitably in the range of about 60° to 90° C. The drying is in general continued for 2 to 4 hours until the moisture content of the banana pieces is not more than about 6% by weight. This is because if the drying temperature is less than 60° C., the drying time becomes long and chips which are soft in taste and soggy tend to be obtained, while if the drying temperature is more than 90° C., the taste of the banana pieces is impaired and hard chips which are of low quality because of drying are often obtained. The means used for heating is not critical in the present invention. However, preferred means for heating are radiation heating ones such as those utilizing infrared rays. After the completion of the heat-drying step, the pressure is returned to normal and the resulting banana chips are transferred to the subsequent processes such as the packaging process.

In this invention, the time elapsed from the cutting of the bananas to the completion of the reduction of pressure is controlled to not more than 20 minutes, preferably not more than 10 minutes. The color change (browning) of the bananas can be reliably restricted by reducing the pressure to the reduced pressure within the period defined above.

Referring now to the attached FIG. 1, a specific apparatus which may be used to carry out the method of this invention will be explained.

In FIG. 1, the reference numeral 1 denotes a drying chamber which is equipped with a shelf 2 for receiving material A to be treated. Heaters 3 and 4 are disposed above and below the shelf 2. A cold trap 6 is connected to the drying chamber 1 at the side wall thereof through a pipe 5 and to a vacuum pump 8 through a pipe 7. The pipes 5 and 7 are provided with valves 9 and 10 respectively and a reservoir tank 13 is connected to the pipe 5 through pipes 11 and 12 disposed before and behind the pipe 5 respectively. In addition, the pipes 11 and 12 each is provided with a valve 14 or 15. An air supply pipe 16, which serves to return the pressure in the drying chamber 1 to normal pressure after the drying treatment, is disposed on the upper side of the drying chamber 1 and is provided with a needle valve 17.

The expansion treatment using such an apparatus is carried out as follows. The bananas which have been cut and temperature conditioned are placed on the shelf 2 in the drying chamber 1 and then the lid of the chamber is closed. Then, the cold trap 6 is operated, the valves 9 and 14 are closed and the pressure in the reservoir tank 13 is established to 5 to 40 Pa by opening the valves 10 and 15 and actuating the vacuum pump 8. At this stage, the valve 15 is closed while the valve 14 is opened to reduce the pressure in the drying chamber 1 to 150 to 500 Pa within a short period of time (within one minute). Moreover, the heat drying treatment is effected as follows. The valve 14 is closed, while the valve 9 is opened to reduce the pressure in the drying chamber 1 to 20 to 50 Pa. Thereafter, the infrared lamps 3 and 4 are switched on to dry the materials at a desired temperature for a desired period of time. Then, the valve 9 is closed, the vacuum pump 8 is stopped and the valve 16 is slowly opened to return the pressure in the drying chamber 1 to normal pressure. Then, the lid of chamber is opened to remove dried chips of banana.

The method of the present invention makes it possible to provide chips of bananas which retain the inherent taste of fresh banana, have excellent appearance without quality impairment due to drying and without any browning. Moreover, the chips are properly expanded and are crisp. Therefore, they are very excellent as a snack food.

EXAMPLE

The present invention will hereunder be explained with reference to the following Examples.

Example 1

Peeled bananas were cut in round slices having a thickness of about 5 mm and then the temperature of the slices of banana was adjusted to about 11° C. The banana slices were introduced into a vacuum dryer immediately after the temperature conditioning thereof and the pressure in the vacuum dryer was set at 350 Pa within a short period (within 1 minute). The time elapsed from the cutting of the banana to the set at the pressure 350 Pa was about 10 minutes. The banana slices were held at that pressure for 5 minutes. Then the pressure of the dryer was set at 20 Pa and the slices were heat-dried at that pressure and a temperature of 80° C. for 3.5 hours to obtain banana chips.

The moisture content of the resultant banana chips was 4.4% by weight. The banana chips thus produced exhibited fresh taste, were properly expanded and were crisp and crunchy. Therefore, these chips were very excellent as a snack food. The properties of the resultant banana chips are summarized in Table I below.

Comparative Example 1

Banana chips were produced according in the same manner as in Example 1 except that the time elapsed from the cutting of the banana to the setting of the pressure in the vacuum dryer of 350 Pa within a short period was set at 25 minutes. The properties of the resultant banana chips are summarized in the following Table I.

TABLE I

Example 1

Appearance:
  The banana chips were not impaired in quality due to drying and were properly expanded.
Taste:
  The chips were crisp, easily melted in the mouth and had sufficient taste of banana.

Comparative Example 1

Appearance:

The banana chips were slightly over-dried and had a blackish color.

Taste:

The chips were crisp in taste and exhibited sufficient taste of the banana.

What is claimed is:

1. A method for producing fruit chips comprising the steps of:

(a) cutting bananas into small pieces;

(b) adjusting the temperature of the pieces of bananas to provide for a uniform temperature thereof from 5° to 20° C.;

(c) expanding the resulting pieces of bananas by quickly reducing the pressure from normal pressure to a reduced pressure ranging from 150 to 500 Pa within one minute; and (d) heating the expanded pieces of bananas under a reduced pressure which is lower than the pressure in step (c) at a temperature of 60°–90° C.;

the time elapsed from the cutting step (a) to the completion of reduction of the pressure in the step (c) being not more than 20 minutes.

2. A method according to claim 1 wherein, in the step (a), the bananas are cut into small pieces having a thickness of 3 to 5 mm.

3. A method according to claim 1 wherein the expanding treatment is carried out by quickly reducing the pressure to the prescribed reduced pressure and then maintaining the pieces of bananas at the reduced pressure for 5 to 15 minutes.

4. A method according to claim 1 wherein the pressure during heating in the step (d) ranges from 20 to 50 Pa.

* * * * *